(12) United States Patent
Wu (10) Patent No.: US 11,490,244 B2
(45) Date of Patent: Nov. 1, 2022

(54) MOBILITY INFORMATION REPORTING AND EXCHANGE METHOD, TERMINAL DEVICE, AND NETWORK DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 0 days.

(21) Appl. No.: 17/031,896

(22) Filed: Sep. 25, 2020

(65) Prior Publication Data

US 2021/0014664 A1 Jan. 14, 2021

Related U.S. Application Data

(63) Continuation of application No. PCT/CN2019/080093, filed on Mar. 28, 2019.

(30) Foreign Application Priority Data

Apr. 2, 2018 (CN) .......................... 201810284640.8

(51) Int. Cl.
*H04W 8/08* (2009.01)
*H04W 4/029* (2018.01)

(52) U.S. Cl.
CPC ............. *H04W 8/08* (2013.01); *H04W 4/029* (2018.02)

(58) Field of Classification Search
CPC ......... H04W 8/08; H04W 4/029; H04W 8/02; H04W 4/025
See application file for complete search history.

(56) References Cited

U.S. PATENT DOCUMENTS

| 9,307,518 | B2* | 4/2016 | Han | .................. H04W 36/0085 |
| 10,375,665 | B2* | 8/2019 | Li | ........................... H04W 8/02 |
| 2012/0122515 | A1* | 5/2012 | Han | ...................... H04W 48/20 455/507 |
| 2014/0349658 | A1* | 11/2014 | Lin | ..................... H04W 64/006 455/441 |

(Continued)

FOREIGN PATENT DOCUMENTS

| CN | 102769879 A | 11/2012 |
| CN | 103209450 A | 7/2013 |

(Continued)

OTHER PUBLICATIONS

First Office Action issued in related Chinese application No. 201810284640.8, dated Apr. 20, 2020, 11 pages.

(Continued)

*Primary Examiner* — Qutbuddin Ghulamali
(74) *Attorney, Agent, or Firm* — IPX PLLC (57) ABSTRACT

This disclosure discloses a mobility information reporting and exchange method, a terminal device, and a network device. The mobility information reporting method includes obtaining mobility information, where the mobility information includes at least one of geographical location information of the terminal device, time information corresponding to the geographical location information, and identification information of the terminal device, and reporting the mobility information to the network device.

20 Claims, 4 Drawing Sheets

(56) References Cited

U.S. PATENT DOCUMENTS

| | | | |
|---|---|---|---|
| 2015/0208377 A1* | 7/2015 | Han | H04W 64/006 |
| | | | 455/437 |
| 2016/0100355 A1* | 4/2016 | Chen | H04W 72/085 |
| | | | 370/232 |
| 2017/0289902 A1* | 10/2017 | Mochizuki | H04B 7/024 |
| 2019/0020987 A1* | 1/2019 | Khoryaev | H04W 76/14 |
| 2019/0239031 A1* | 8/2019 | Li | H04W 24/10 |

FOREIGN PATENT DOCUMENTS

| | | |
|---|---|---|
| CN | 103210685 A | 7/2013 |
| CN | 104902529 A | 9/2015 |
| CN | 107809767 A | 3/2018 |

OTHER PUBLICATIONS

International Search Report issued in corresponding International Application No. PCT/CN2019/080093, dated Jun. 13, 2019, 4 pages.

* cited by examiner

FIG. 7 ically obtain the information about the cell last accessed by the terminal device and the related mobility information, and transmit the information to a target base station through an X2 interface. After receiving the information, the target base station may provide configuration information for the terminal device based on the information, for example, may change the cell accessed by the terminal device.

MOBILITY INFORMATION REPORTING AND EXCHANGE METHOD, TERMINAL DEVICE, AND NETWORK DEVICE

CROSS-REFERENCE TO RELATED APPLICATIONS

This application is a bypass continuation of PCT Application No. PCT/CN2019/080093 filed Mar. 28, 2019, which claims priority to Chinese Patent Application No. 201810284640.8 filed in China on Apr. 2, 2018, both of which are incorporated herein by reference in their entireties.

TECHNICAL FIELD

This disclosure relates to the field of communications, and in particular to a mobility information reporting and exchange method, a terminal device, and a network device.

BACKGROUND

When providing configuration information for a terminal device, a base station usually needs to obtain information about a cell last accessed by the terminal device and related mobility information. Specifically, a source base station may actively obtain the information about the cell last accessed by the terminal device and the related mobility information, and transmit the information to a target base station through an X2 interface. After receiving the information, the target base station may provide configuration information for the terminal device based on the information, for example, may change the cell accessed by the terminal device.

However, in practical application, the cell information and mobility information actively obtained by the source base station usually has low accuracy. Due to the low accuracy of the information, the target base station cannot accurately provide configuration information for the terminal device.

SUMMARY

Embodiments of this disclosure provide a mobility information reporting and exchange method, a terminal device, and a network device, to solve a problem in the related art of failure to accurately provide configuration information for a terminal device due to low accuracy of cell information and mobility information actively obtained by a source base station.

According to a first aspect, a mobility information reporting method is provided, which is applied to a terminal device. The method includes:
obtaining mobility information, where the mobility information includes at least one of geographical location information of the terminal device, time information corresponding to the geographical location information, and identification information of the terminal device; and
reporting the mobility information to a network device.

According to a second aspect, a mobility information exchange method is provided, which is applied to a network device. The method includes:
receiving mobility information reported by a terminal device, where the mobility information is obtained by the terminal device, and the mobility information includes at least one of geographical location information of the terminal device, time information corresponding to the geographical location information, and identification information of the terminal device; and
sending the mobility information to another network device.

According to a third aspect, a terminal device is provided. The terminal device includes:
an obtaining module, which obtains mobility information, where the mobility information includes at least one of geographical location information of the terminal device, time information corresponding to the geographical location information, and identification information of the terminal device; and
a reporting module, which reports the mobility information to a network device.

According to a fourth aspect, a network device is provided. The network device includes:
a receiving module, which receives mobility information reported by a terminal device, where the mobility information is obtained by the terminal device, and the mobility information includes at least one of geographical location information of the terminal device, time information corresponding to the geographical location information, and identification information of the terminal device; and
a sending module, which sends the mobility information to another network device.

According to a fifth aspect, a terminal device is provided. The terminal device includes a processor, a memory, and a computer program that is stored in the memory and capable of running on the processor, where when the computer program is executed by the processor, the steps of the method according to the first aspect are implemented.

According to a sixth aspect, a network device is provided. The network device includes a processor, a memory, and a computer program that is stored in the memory and capable of running on the processor, where when the computer program is executed by the processor, the steps of the method according to the second aspect are implemented.

According to a seventh aspect, a computer-readable storage medium is provided, the computer-readable storage medium storing a computer program, where when the computer program is executed by a processor, the steps of the method according to the first aspect are implemented.

According to an eighth aspect, a computer-readable storage medium is provided, the computer-readable storage medium storing a computer program, where when the computer program is executed by a processor, the steps of the method according to the second aspect are implemented.

In the technical solutions provided in the embodiments of this disclosure, the terminal device obtains the mobility information, where the mobility information includes at least one of the geographical location information of the terminal device, the time information corresponding to the geographical location information, and the identification information of the terminal device; and reports the mobility information to the network device. In the embodiments of this disclosure, the terminal device obtains its own mobility information, and the mobility information obtained in such a way is more diverse and accurate than the mobility information of the terminal device actively obtained by the source base station. Because the mobility information obtained by the terminal device is more diverse and accurate, after the terminal device reports the obtained mobility information to the network device, the network device can provide more accurate configuration information for a user.

BRIEF DESCRIPTION OF DRAWINGS

The drawings described herein are intended for a further understanding of this disclosure and constitute a part of this disclosure. Example embodiments of this disclosure and descriptions thereof are intended to explain this disclosure, and do not constitute any inappropriate limitation on this disclosure. In the drawings.

DETAILED DESCRIPTION

In the related art, when providing configuration information for a terminal device, a base station needs to obtain information about a cell last accessed by the terminal device and related mobility information, and transmit the information to a target base station, so that the target base station provides configuration information for the terminal device. However, because the information obtained by the base station has low accuracy, it is impossible to provide more accurate configuration information for the terminal device.

In view of this, the embodiments of this disclosure provide a mobility information reporting and exchange method, a terminal device, and a network device. The mobility information reporting method is applied to the terminal device, and includes: obtaining mobility information, where the mobility information includes at least one of geographical location information of the terminal device, time information corresponding to the geographical location information, and identification information of the terminal device; and reporting the mobility information to the network device.

Compared with the related art, the technical solutions provided in the embodiments of this disclosure have at least the following beneficial effects:

(1) The terminal device obtains its own mobility information, and the mobility information obtained in such a way is more diverse and accurate.

(2) Compared with mobility information exchange between base stations, reporting the mobility information to the network device by the terminal device enables the terminal device to implement faster measurement and reporting.

(3) Because the mobility information obtained by the terminal device is more accurate and diverse, after the terminal device reports the obtained mobility information to the network device, the network device can provide more accurate configuration information for the terminal device based on the mobility information reported by the terminal device.

The following clearly describes the technical solutions in the embodiments of this disclosure with reference to the accompanying drawings in the embodiments of this disclosure. Apparently, the described embodiments are some rather than all of the embodiments of this disclosure. Based on the embodiments of this disclosure, all other embodiments derived by persons of ordinary skill in the art without creative efforts fall within the protection scope of this disclosure.

The technical solutions of this disclosure can be applied to various communications systems, for example, a global system for mobile communications (Global System of Mobile communication, GSM), a code division multiple access (Code Division Multiple Access, CDMA) system, wideband code division multiple access (Wideband Code Division Multiple Access, WCDMA), general packet radio service (General Packet Radio Service, GPRS), long term evolution (Long Term Evolution, LTE)/long term evolution advanced (Long Term Evolution advanced, LTE-A), and NR (New Radio).

The terminal device may be understood as user equipment (User Equipment, UE) or referred to as a mobile terminal (Mobile Terminal), mobile user equipment, or the like, and can communicate with one or more core networks, for example, via a radio access network (Radio Access Network, RAN). The user equipment may be a mobile terminal, for example, a mobile phone (or referred to as a "cellular" phone) and a computer provided with a mobile terminal. For example, the user equipment may be a portable, pocket-sized, handheld, computer built-in, or in-vehicle mobile apparatus. Alternatively, the user equipment may be an aircraft such as an unmanned aerial vehicle or a flying machine. These devices exchange voice and/or data with the radio access network.

The base station may be a base transceiver station (Base Transceiver Station, BTS) in GSM or CDMA, a NodeB (NodeB) in WCDMA, an evolved NodeB (evolutional Node B, eNB or e-NodeB) in LTE, or a 5G base station (gNB). This is not limited in this disclosure, but for ease of description, the following embodiments use the gNB as an example for description.

The technical solutions provided in the embodiments of this disclosure are described in detail below with reference to the accompanying drawings.

Figure 1:
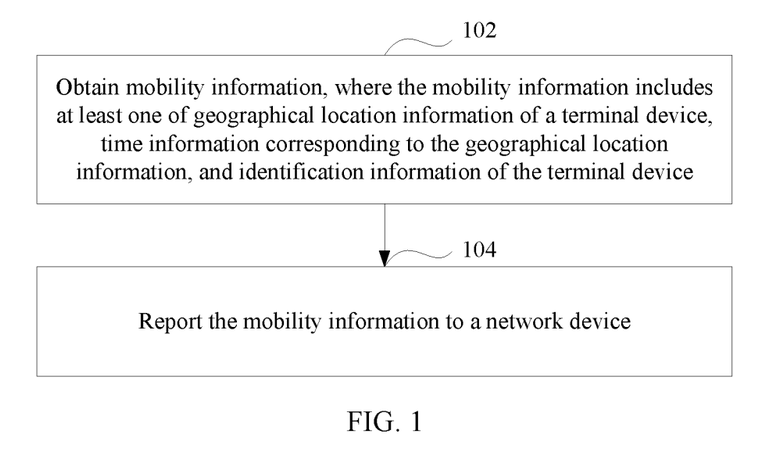
FIG. 1 is a schematic flowchart of a mobility information reporting method according to an embodiment of this disclosure.

FIG. 1 is a schematic flowchart of a mobility information reporting method according to an embodiment of this disclosure. The method is applied to a terminal device, and the method is described as follows.

Step 102: Obtain mobility information, where the mobility information includes at least one of geographical location information of the terminal device, time information corresponding to the geographical location information, and identification information of the terminal device.

In this embodiment of this disclosure, the terminal device may have a function of recording its own mobility information, and when needing to report the recorded mobility information to a network device, the terminal device may obtain the recorded mobility information.

Content of the mobility information may specifically include one or more of the geographical location information of the terminal device, the time information corresponding to the geographical location information, and the identification information of the terminal device. This is not specifically limited herein.

The geographical location information may be any combination of one or more of the following types of information: coordinate information of the terminal device, identification information of a cell accessed by the terminal device, identification information of a tracking area (Tracking Area, TA) accessed by the terminal device, identification information of a radio access network notification area (RAN Notification Area, RNA) accessed by the terminal device, identification information of a broadcast area accessed by the terminal device, identification information of a broadcast information sending area accessed by the terminal device, and movement speed information of the terminal device. This is not specifically limited herein. A geographical location of the terminal device can be determined based on one or more types of information included in the geographical location information.

In this embodiment of this disclosure, the coordinate information of the terminal device may be global positioning system (Global Positioning System, GPS) coordinate information, which may specifically include at least one of horizontal coordinate information and vertical coordinate information. The coordinate information of the terminal device can be obtained by positioning software in the terminal device.

The identification information of the cell accessed by the terminal device may be global identification information (Cell Global Identifier, CGI) of the cell accessed by the terminal device, or may be physical identification information (Physical Cell Identifier, PCI) and frequency of the cell accessed by the terminal device. This is not specifically limited herein.

The identification information of the tracking area TA accessed by the terminal device may be a tracking area identity (Tracking Area Identity, TAI).

The identification information of the radio access network notification area RNA accessed by the terminal device may be a notification area identity (RNA Identity, RNAID).

The identification information of the broadcast area accessed by the terminal device may be a multimedia broadcast multicast service single frequency network area identity (Multimedia Broadcast multicast service Single Frequency Network area ID, MBSFN area ID).

The identification information of the broadcast information sending area accessed by the terminal device may be a system information block type 1 (System Information Block Type 1, SIB1) sending area identity.

The movement speed information of the terminal device may be a movement speed of the terminal device in a unit time, and may specifically include a horizontal speed of the terminal device, a vertical speed of the terminal device, and a speed of the terminal device relative to a base station transmission point. The horizontal speed of the terminal device may be a horizontal speed of the terminal device relative to the ground; the vertical speed of the terminal device may be a vertical speed of the terminal device relative to the ground; and the speed of the terminal device relative to the base station transmission point may be a speed at which the terminal device approaches the base station transmission point, or may be a speed at which the terminal device leaves the base station transmission point. The base station transmission point may be a base station corresponding to a cell in which the terminal device is located when the terminal device determines its movement speed information.

It should be noted that the one or more types of information included in the foregoing recorded geographical location information may be historical information of the terminal device, or current information of the terminal device, or predicted information of the terminal device within a period of time in the future. This is not specifically limited herein. For example, the identification information of the cell accessed by the terminal device may be identification information of a cell accessed by the terminal device within a period of time in the past, or identification information of a cell currently accessed by the terminal device, or predicted identification information of a cell accessed by the terminal device within a period of time in the future (for example, if identification information of a cell accessed by the terminal device in a day at 3 p.m. is known to be A, it can be predicted that identification information of a cell accessed by the terminal device in the next day at 3 p.m. is A).

The time information included in the mobility information may correspond to the geographical location information, and may specifically include at least one of time point information when the terminal device is at a geographical location and duration in which the terminal device stays at a geographical location.

The time point information may include at least one of absolute time information and relative time information. The absolute time information may be a specific year, month, day, hour, second, millisecond, and microsecond (whether the absolute time information is accurate to day, hour, second, or millisecond may be determined based on an actual situation), and the relative time information may be deltaT.

For example, a time point corresponding to coordinate information initially recorded by the terminal device (or a time point corresponding to coordinate information recorded last time) is t1, and a time point corresponding to subsequently recorded coordinate information (or a time point corresponding to coordinate information recorded this time) is time t2. In this case, a difference between t2 and t1 is the relative time information, that is, t2=t1+deltaT.

The identification information of the terminal device may be a combination of any one or more of the following types of information: identification information determined in subscription to the network device, cell radio network temporary identifier (Cell Radio Network Temporary Identitifier C-RNTI) information, system architecture evolution temporary mobile station identity (system architecture evolution (System Architecture Evolution, SAE) Temporary Mobile Station Identifier, S-TMSI) information, international mobile subscriber identity (International Mobile Subscriber Identity, IMSI) information, connection resume identification information, flight terminal identification information, and ground terminal identification information. An identifier of the terminal device can be determined based on one or more of these types of identification information.

The identification information determined in the subscription to the network device may be identification information determined by the terminal device in the subscription to the network device, and the identification information may be used for the terminal device to report the mobility information obtained by the terminal device.

The connection resume identifier (Resume ID) may be identification information configured by a network device in a 5G system for an INACTIVE state of the terminal device, or may be identification information configured by a network device in an LTE system for a light connection (light connection) state of the mobile terminal.

The flight terminal identification information may be identification information of the terminal device during flight, and the ground terminal identification information may be identification information of the terminal device when on the ground. Because a signal of the network device has different coverage areas in the air and on the ground, it is possible to determine whether the terminal device is in flight or on the ground, based on the flight terminal identification information or the ground terminal identification information of the terminal device.

It should be noted that the one or more types of information included in the foregoing recorded identification information of the terminal device may be historical identification information of the terminal device, or current identification information of the terminal device, or predicted identification information of the terminal device within a period of time in the future. This is not specifically limited herein. The identifier of the terminal device can be determined based on the identification information of the terminal device.

In this embodiment of this disclosure, there may further be at least one type of mobility information, which may specifically include at least one of the following:

flight movement information; ground movement information; mobility information when the terminal device is in an idle state; mobility information when the terminal device is in a connected state; mobility information when the terminal device is in an inactive state; and mobility information when the terminal device is in a state other than the idle state, the connected state, and the inactive state.

The flight movement information may be movement information of the terminal device during flight, for example, movement track information of the terminal device during flight. The ground movement information may be movement information of the terminal device on the ground, for example, movement track information of the terminal device on the ground. The flight movement information and the ground movement information may be historical information of the terminal device, or current information of the terminal device, or predicted information of the terminal device within a period of time in the future.

The mobility information when the terminal device is in the idle state may be understood as mobility information of the terminal device when the terminal device is in the idle state; the mobility information when the terminal device is in the connected state may be understood as mobility information of the terminal device when the terminal device is in the connected state; and the mobility information when the terminal device is in the inactive state may be understood as mobility information of the terminal device when the terminal device is in the inactive state. The idle state, the connected state, and the inactive state are all states related to radio resource control (Radio Resource Control, RRC).

The mobility information when the terminal device is in the state other than the idle state, the connected state, and the inactive state may be understood as mobility information when the terminal device is in a state irrelevant to RRC.

It should be noted that the foregoing recorded mobility information when the terminal device is in different states (the idle state, connected state, inactive state, and other states) may be historical information of the terminal device, or current information of the terminal device, or predicted information of the terminal device within a period of time in the future. The mobility information when the terminal device is in the idle state is used as an example. The mobility information may be mobility information when the terminal device is in the idle state within a period of time in the past, or may be mobility information when the terminal device is currently in the idle state, or may be predicted mobility information of the terminal device when the terminal device is in the idle state within a period of time in the future.

It should be noted that, one type of mobility information may include at least one of the foregoing recorded geographical location information of the terminal device, the time information corresponding to the geographical location information, and the identification information of the terminal device.

In this embodiment of this disclosure, the terminal device may obtain its own mobility information, and the mobility information obtained in such a way is more diverse and accurate, and is obtained faster than mobility information obtained by the base station.

After obtaining the mobility information, the terminal device may perform step 104.

Step 104: Report the mobility information to a network device.

In step 104, after obtaining the mobility information, the terminal device may actively report the mobility information to the network device.

In this embodiment of this disclosure, the terminal device may report the mobility information to one or more network devices. The network device may be: one or more of a base station, a mobility management entity (Mobility Management Entity, MME), a serving gateway (Serving Gateway, S-GW), a packet data network gateway (PDN (Packet Data Network) Gateway, PDN-GW), an access and mobility management function (Access and Mobility Management Function, AMF) entity, user plane function (User Plane Function, UPF) entity, a session management function (Session Management Function, SMF) entity, and a dedicated application server.

In another embodiment of this disclosure, after the terminal device obtains the mobility information, and before the terminal device reports the mobility information to the network device, the method further includes:

sending prompt information to the network device, where the prompt information is used to prompt that the terminal device has the mobility information; and receiving a mobility information obtaining request from the network device, where the mobility information obtaining request is used to request the terminal device to report the mobility information.

Specifically, after obtaining the mobility information, the terminal device may send prompt information to the network device, where the prompt information is used to prompt the network device that the terminal device has the mobility information. Content of the prompt information may specifically include at least one of the following:

the terminal device has flight movement information; the terminal device has ground movement information; the terminal device has mobility information when the terminal device is in an idle state; the terminal device has mobility information when the terminal device is in a connected state; the terminal device has mobility information when the terminal device is in an inactive state; and the terminal device has mobility information when the terminal device is in a state other than the idle state, the connected state, and the inactive state.

The flight movement information and the ground movement information may be the same as the foregoing recorded flight movement information and ground movement information determined by the terminal device, and are not repeated herein.

For the mobility information of the terminal device when the terminal device is in the idle state, the connected state, the inactive state, and the state other than the idle state, the connected state, and the inactive state, refer to related descriptions of the plurality of types of mobility information recorded above, which are not repeated herein either.

The terminal device may prompt, by using the prompt information, the network device that the terminal device has at least one of the flight movement information, the ground movement information, the mobility information in the idle state, the mobility information in the connected state, the mobility information in the inactive state, and the mobility information in the state other than the idle state, the connected state, and the inactive state. Specific content of the prompt information may correspond to the mobility information obtained by the terminal device.

For example, if the terminal device obtains the mobility information in the idle state, the prompt information may be that the terminal device has the mobility information in the idle state; or if the terminal device obtains the flight movement information, the mobility information in the idle state, and the mobility information in the connected state, the prompt information may be that the terminal device has the mobility information in the idle state, or may be that the terminal device has the flight movement information and the mobility information in the idle state, or may be that the terminal device has the mobility information in the idle state and the mobility information in the connected state. Examples are not listed herein.

Optionally, the mobility information may include the identification information of the terminal device. In other words, when prompting the network device that the terminal device has the mobility information, the terminal device may simultaneously report the identifier of the terminal device to the network device.

In this embodiment of this disclosure, the sending, by the terminal device, prompt information to the network device may include:

sending a radio resource control RRC message to the network device, where the RRC message carries the prompt information; or sending a non-access stratum (Non-access Stratum, NAS) message to the network device, where the NAS message carries the prompt information.

To be specific, the terminal device may send the prompt information to the network device by using the RRC message, or may send the prompt information to the network device by using the NAS message, or send the prompt information to the network device by using both the RRC message and the NAS message. This is not limited herein.

In practical application, a specific manner in which the terminal device sends the prompt information may be determined based on a type of the network device. For example, if the network device is a base station, the prompt information may be sent by using the RRC message; or if the network device is an MME, the prompt information may be sent by using the NAS message.

After the terminal device sends the prompt information to the network device, the network device may determine that the terminal device has the mobility information. In this case, the network device may send a mobility information obtaining request to the terminal device, to request the terminal device to report the mobility information.

In an implementation, before sending the mobility information obtaining request to the terminal device, the network device may determine whether a preset condition for receiving the mobility information is currently satisfied. The preset condition may be a condition corresponding to the network device or the terminal device, and may be specifically at least one of storage space of the network device, a transmission resource of the network device, and signal quality of a cell in which the terminal device is currently located.

Satisfying the preset condition for receiving the mobility information may be that the network device has sufficient storage space, or that the network device has an available transmission resource, or that the signal quality of the cell in which the terminal device is currently located is lower than a threshold.

When the network device determines that the preset condition for receiving the mobility information is satisfied (provided that at least one of the conditions is satisfied), the network device may send the mobility information obtaining request to the terminal device, to request the terminal device to report the mobility information. The network device may send the mobility information obtaining request by using at least one of the RRC message and the NAS message, which is specifically determined depending on the type of the network device.

For example, if the network device is a base station, the mobility information obtaining request may be included in the RRC message and then sent to the terminal device; or if the network device is a mobility management entity MME, a serving gateway S-GW, a packet data network gateway PDN-GW, an access and mobility management function AMF entity, a user plane function UPF entity, a session management function SMF entity, or a dedicated application server, the mobility information obtaining request may be included in the NAS message and then sent to the terminal device.

After receiving the mobility information obtaining request from the network device, the terminal device may report the obtained mobility information to the network device.

After the terminal device reports the mobility information to the network device, the network device may provide configuration information for the terminal device based on the mobility information. For example, an accurate cell handover can be performed for the terminal device, to provide a better network service for the terminal device.

In this embodiment of this disclosure, because the mobility information reported to the network device by the terminal device is more diverse and accurate, the network device can provide more accurate configuration information for the terminal device based on the mobility information reported by the terminal device. For example, the network device can perform, based on the mobility information, a more accurate cell handover for the terminal device.

In addition, because the terminal device can obtain its own mobility information and reports the mobility information to the network device, compared with the related art, faster measurement and reporting of the mobility information can be implemented.

In the technical solution provided in this embodiment of this disclosure, the terminal device obtains the mobility information, where the mobility information includes at least one of the geographical location information of the terminal device, the time information corresponding to the geographical location information, and the identification information of the terminal device; and reports the mobility information to the network device. In this embodiment of this disclosure, the terminal device obtains its own mobility information, and the mobility information obtained in such a way is more diverse and accurate than mobility information of the terminal device actively obtained by a source base station. Because the mobility information obtained by the terminal device is more diverse and accurate, after the terminal device reports the obtained mobility information to the network device, the network device can provide more accurate configuration information for a user.

Figure 2:
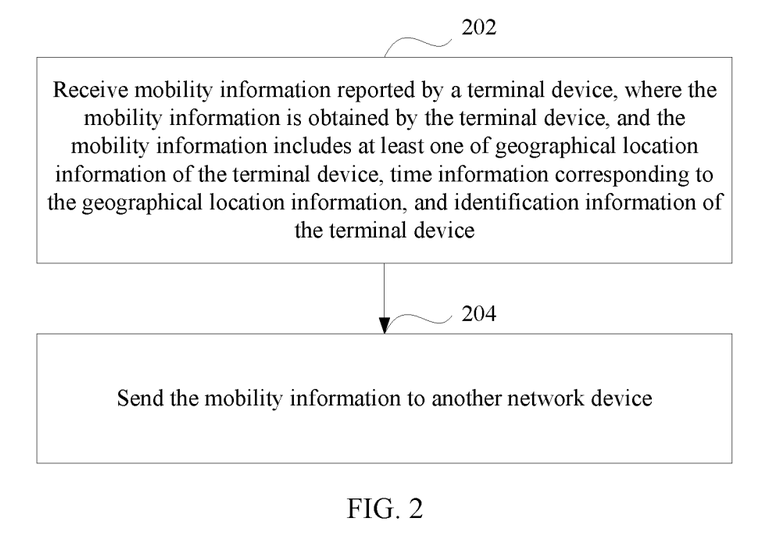
FIG. 2 is a schematic flowchart of a mobility information exchange method according to an embodiment of this disclosure.

FIG. 2 is a schematic flowchart of a mobility information exchange method according to an embodiment of this disclosure. The method is applied to a network device, and the method is described as follows.

Step 202: Receive mobility information reported by a terminal device, where the mobility information is obtained by the terminal device, and the mobility information includes at least one of geographical location information of the terminal device, time information corresponding to the geographical location information, and identification information of the terminal device.

In an embodiment of this disclosure, the terminal device may have a function of recording its own mobility information, and after obtaining the mobility information recorded by the terminal device, the terminal device may report the mobility information to the network device. In this case, the network device may receive the mobility information reported by the terminal device.

The mobility information may include one or more of the geographical location information of the terminal device, the time information corresponding to the geographical location information, and the identification information of the terminal device. This is not specifically limited herein.

The geographical location information may include one or more of coordinate information of the terminal device, identification information of a cell accessed by the terminal device, identification information of a tracking area TA accessed by the terminal device, identification information of a radio access network notification area RNA accessed by the terminal device, identification information of a broadcast area accessed by the terminal device, identification information of a broadcast information sending area accessed by the terminal device, and movement speed information of the terminal device. For specific content, refer to related descriptions recorded in the embodiment shown in FIG. 1. Details are not repeated herein.

The time information may include at least one of time point information when the terminal device is at a geographical location and duration in which the terminal device stays at a geographical location. The time point information may include at least one of absolute time information and relative time information. For specific content, refer to related descriptions recorded in the embodiment shown in FIG. 1. Details are not repeated herein.

The identification information of the terminal device may include one or more of identification information determined in subscription to the network device, cell radio network temporary identifier C-RNTI information, system architecture evolution temporary mobile station identity S-TMSI information, international mobile subscriber identity IMSI information, connection resume identification information, flight terminal identification information, and ground terminal identification information. For specific content, refer to related descriptions recorded in the embodiment shown in FIG. 1. Details are not repeated herein.

In this embodiment of this disclosure, there may further be at least one type of mobility information, which may specifically include at least one of the following:

flight movement information; ground movement information; mobility information when the terminal device is in an idle state; mobility information when the terminal device is in a connected state; mobility information when the terminal device is in an inactive state; and mobility information when the terminal device is in a state other than the idle state, the connected state, and the inactive state.

For specific content of each type of mobility information, refer to related descriptions recorded in the embodiment shown in FIG. 1. Details are not repeated herein.

In another embodiment of this disclosure, before the network device receives the mobility information reported by the terminal device, the method further includes:

receiving prompt information sent by the terminal device, where the prompt information is used to prompt that the terminal device has the mobility information; and sending a mobility information obtaining request to the terminal device, where the mobility information obtaining request is used to request the terminal device to report the mobility information.

Specifically, after obtaining its own mobility information, the terminal device may not actively report the mobility information to the network device, but send the prompt information to the network device, where the prompt information is used to prompt that the terminal device has the mobility information. For a specific manner in which the terminal device sends the prompt information, refer to related content recorded in the embodiment shown in FIG. 1. Details are not repeated herein.

Content of the prompt information sent by the terminal device may include at least one of the following:

the terminal device has flight movement information; the terminal device has ground movement information; the terminal device has mobility information when the terminal device is in an idle state; the terminal device has mobility information when the terminal device is in a connected state; the terminal device has mobility information when the terminal device is in an inactive state; and the terminal device has mobility information when the terminal device is in a state other than the idle state, the connected state, and the inactive state.

For specific content of each type of prompt information, refer to related descriptions recorded in the embodiment shown in FIG. 1. Details are not repeated herein.

After receiving the prompt information from the terminal device, the network device may send the mobility information obtaining request to the terminal device, to request the terminal device to report the mobility information.

In an implementation, before sending the mobility information obtaining request to the terminal device, the network device may determine whether a preset condition for receiving the mobility information is currently satisfied. For a specific implementation in which the network device determines whether the preset condition for receiving the mobility information is satisfied, refer to related content recorded in the embodiment shown in FIG. 1, Details are not repeated herein.

When the network device determines that the preset condition for receiving the mobility information is satisfied, the network device may send the mobility information obtaining request to the terminal device, to request the terminal device to report the mobility information.

The sending, by the network device, a mobility information obtaining request to the terminal device may include:

sending a radio resource control RRC message to the terminal device, where the RRC message carries the mobility information obtaining request; or sending a non-access stratum NAS message to the terminal device, where the NAS message carries the mobility information obtaining request.

To be specific, the network device may send the mobility information obtaining request by using the RRC message, or may send the mobility information obtaining request by using the NAS message, or send the mobility information obtaining request by using both the RRC message and the NAS message, which may be specifically determined depending on a specific type of the network device.

For example, if the network device is a base station, the mobility information obtaining request may be sent by using the RRC message; or if the network device is a mobility management entity MME, a serving gateway S-GW, a packet data network gateway PDN-GW, an access and mobility management function AMF entity, a user plane function UPF entity, a session management function SMF entity, or a dedicated application server, the prompt information may be sent by using the NAS message.

After the network device sends the mobility information obtaining request to the terminal device, the terminal device may report the obtained mobility information to the network device based on the mobility information obtaining request. In this case, the network device may receive the mobility information reported by the terminal device.

According to the content recorded above, there are at least two methods for the network device to receive the mobility information sent by the terminal device: One method is receiving the mobility information actively reported by the terminal device; and another method is sending, when it is determined that the terminal device has the mobility information, the mobility information obtaining request to the terminal device, and then receiving the mobility information reported by the terminal device. In practical application, at least one of the methods may be selected based on an actual situation to receive the mobility information reported by the terminal device.

It should be noted that, in this embodiment of this disclosure, there may be one network device that receives the mobility information reported by the terminal device (that is, the terminal device reports the obtained mobility information to one network device), or a plurality of network devices that receive the mobility information reported by the terminal device (that is, the terminal device reports the obtained mobility information to a plurality of network device). The network device may be specifically one or more of a base station, a mobility management entity MME, a serving gateway S-GW, a packet data network gateway PDN-GW, an access and mobility management function AMF entity, a user plane function UPF entity, a session management function SMF entity, and a dedicated application server.

After receiving the mobility information reported by the terminal device, the network device may perform step 204.

In an embodiment of this disclosure, after the network device receives the mobility information reported by the terminal device, the method further includes:

storing the mobility information.

After storing the mobility information, the network device may perform step 204.

Step 204: Send the mobility information to another network device.

In step 204, after receiving the mobility information reported by the terminal device, the network device may actively send the received mobility information to another network device, to implement exchange of the mobility information between a plurality of network devices.

In this embodiment of this disclosure, the another network device may be one or more of a base station, a mobility management entity MME, a serving gateway S-GW, a packet data network gateway PDN-GW, an access and mobility management function AMF entity, a user plane function UPF entity, a session management function SMF entity, and a dedicated application server.

In an embodiment of this disclosure, the sending, by the network device, the mobility information to another network device may further include:

receiving an information request sent by the another network device, where the information request is used to request to obtain the mobility information; and sending the mobility information to the another network device.

Specifically, after the terminal device reports the obtained mobility information to the network device, other network devices that have not received the mobility information (it may be that the terminal device does not report the mobility information to these network devices) may send an information request to the network device that receives the mobility information, to request to obtain the mobility information. In this case, the network device that receives the mobility information may send the mobility information to the other network devices based on the information request. In this way, exchange of the mobility information of the terminal device between the network devices can be implemented.

In other words, after receiving the mobility information reported by the terminal device, the network device may actively push the mobility information to other network devices; or may not actively push the mobility information, but send the mobility information to the other network devices only when receiving the information request that is sent by the other network devices to obtain the mobility information. A selection between these two implementations may be made depending on a specific situation, and this is not specifically limited in this embodiment of this disclosure.

After the network device exchanges the mobility information obtained by the terminal device with a plurality of network devices, the plurality of network devices can assist each other in providing configuration information for the terminal device. Because the mobility information is accurate and diverse, the configuration information provided for the terminal device based on the mobility information is more accurate. For example, an accurate cell handover can be performed for the terminal device, to provide a better network service for the terminal device.

In the technical solution provided in this embodiment of this disclosure, the network device receives the mobility information reported by the terminal device, where the mobility information is obtained by the terminal device, and the mobility information includes at least one of the geographical location information of the terminal device, the time information corresponding to the geographical location information, and the identification information of the terminal device; and the network device sends the mobility information to the another network device. In this way, the network device can receive the mobility information reported by the terminal device, and the mobility information obtained in such a way is more diverse and accurate than mobility information of the terminal device obtained from a source base station. Because the mobility information received by the network device is more diverse and accurate, the network device can provide more accurate configuration information for a user.

Figure 3:
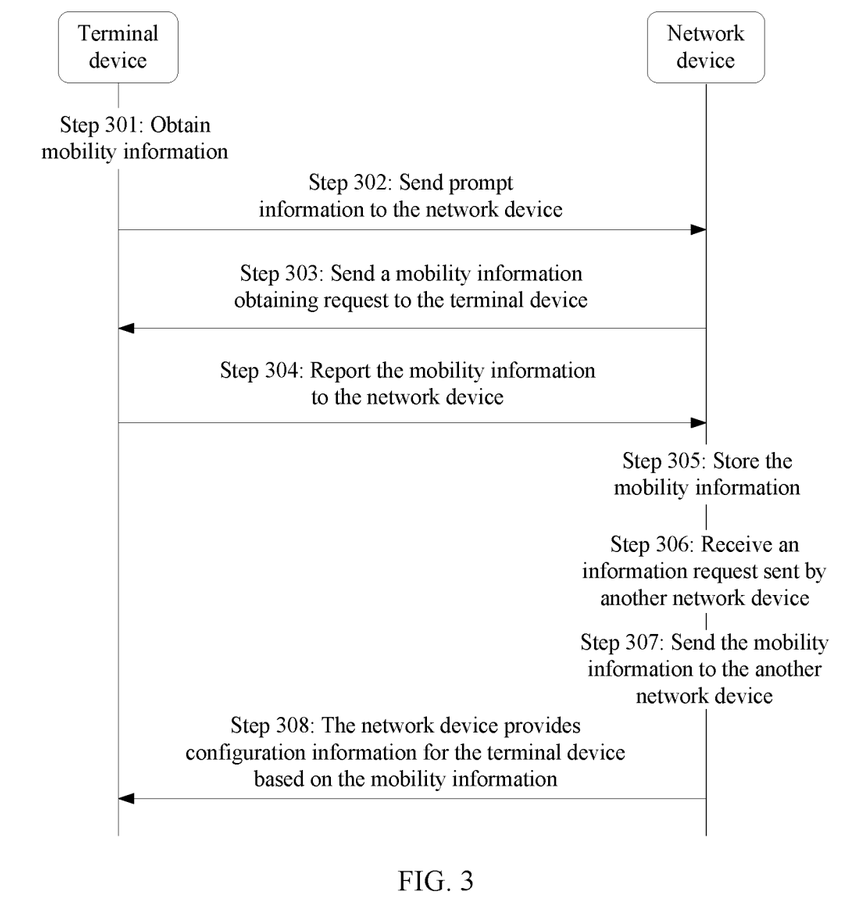
FIG. 3 is a schematic flowchart of a mobility information reporting and exchange method according to an embodiment of this disclosure.

FIG. 3 is a schematic flowchart of a mobility information reporting and exchange method according to an embodiment of this disclosure. The method is described as follows.

Step 301: A terminal device obtains mobility information.

Content of the mobility information obtained by the terminal device may include at least one of geographical location information of the terminal device, time information corresponding to the geographical location information, and identification information of the terminal device.

A type of the mobility information may include at least one of the following:

flight movement information; ground movement information; mobility information when the terminal device is in an idle state; mobility information when the terminal device is in a connected state; mobility information when the terminal device is in an inactive state; and mobility information when the terminal device is in a state other than the idle state, the connected state, and the inactive state.

For specific descriptions of the content and type of the mobility information, refer to content recorded in the embodiment shown in FIG. 1. Details are not repeated herein.

Step 302: The terminal device sends prompt information to a network device.

The prompt information is used to prompt the network device that the terminal device has the mobility information.

In step 302, there may be one or more network devices. The network device may be at least one of a base station, a mobility management entity MME, a serving gateway S-GW, a packet data network gateway PDN-GW, an access and mobility management function AMF entity, a user plane function UPF entity, a session management function SMF entity, and a dedicated application server.

A specific method for sending the prompt information by the terminal device may include at least one of the following:

sending a radio resource control RRC message to the network device, where the RRC message carries the prompt information; or sending a non-access stratum NAS message to the network device, where the NAS message carries the prompt information.

Content of the prompt information may include at least one of the following:

the terminal device has flight movement information; the terminal device has ground movement information; the terminal device has mobility information when the terminal device is in an idle state; the terminal device has mobility information when the terminal device is in a connected state; the terminal device has mobility information when the terminal device is in an inactive state; and the terminal device has mobility information when the terminal device is in a state other than the idle state, the connected state, and the inactive state.

In practical application, the terminal device may determine specific content of the prompt information based on the specific mobility information obtained by the terminal device. Refer to related content recorded in the embodiment shown in FIG. 1 for details, which are not repeated herein.

For a sending manner of and specific content included in the prompt information, refer to related content recorded in the embodiment shown in FIG. 1. Details are not repeated herein.

Step 303: The network device sends a mobility information obtaining request to the terminal device.

The mobility information obtaining request is used to request the terminal device to report the mobility information.

In step 303, after receiving the prompt information sent by the terminal device, and before sending the mobility information obtaining request, the network device may determine whether a preset condition for receiving the mobility information is satisfied, for example, whether the network device has sufficient transmission resources, or whether signal quality of a cell in which the terminal device is located is lower than a threshold. For a specific determining method, refer to related content recorded in the embodiment shown in FIG. 1. Details are not repeated herein.

If the network device determines that the preset condition is satisfied, the network device may send the mobility information obtaining request to the terminal device. If the network device determines that the preset condition is not satisfied, the procedure may be ended.

The sending, by the network device, a mobility information obtaining request to the terminal device may include:

sending a radio resource control RRC message to the terminal device, where the RRC message carries the mobility information obtaining request; or sending a non-access stratum NAS message to the terminal device, where the NAS message carries the mobility information obtaining request.

The network device may determine, based on an actual situation, a method for sending the mobility information obtaining request. For example, if the network device is a base station, the mobility information obtaining request may be included in the RRC message and then sent to the terminal device. For another example, if the network device is an MME, the mobility information obtaining request may be included in the NAS message and then sent to the terminal device. Examples are not listed herein.

Step 304: The terminal device reports the mobility information to the network device.

In step 304, after receiving the mobility information obtaining request sent by the network device, the terminal device may report the mobility information to the network device.

Step 305: The network device stores the mobility information.

Step 306: The network device receives an information request sent by another network device.

The information request is used to request to obtain the mobility information.

In step 306, other network devices that have not received the mobility information (it may be that the terminal device does not report the mobility information to these network devices) may send the information request to the network device that receives or stores the mobility information.

Step 307: The network device sends the mobility information to the another network device.

In step 307, after the network device sends the mobility information to the another network device, exchange of the mobility information between a plurality of network devices can be implemented.

Step 308: The network device provides configuration information for the terminal device based on the mobility information.

After the network device exchanges the mobility information obtained by the terminal device with a plurality of network devices, the plurality of network devices can assist each other to provide configuration information for the terminal device, for example, may perform a cell handover for the terminal device, to provide a better network service for the terminal device. Because the mobility information received by the network device is reported by the terminal device, the content of the mobility information is more diverse and accurate, and therefore the network device can provide more accurate configuration information for the terminal device based on the mobility information.

It should be understood that in an implementation, steps 302 and 303 recorded above may not be performed. In other words, after obtaining its own mobility information, the terminal device may actively report the mobility information to the network device without sending the prompt information to the network device.

In addition, in an implementation, step 306 may not be performed either. In other words, after receiving the mobility information reported by the terminal device, the network device may actively push the mobility information to the another network device, instead of waiting for the information request sent by the another network device and then sending the mobility information to the another network device based on the information request.

In the technical solution provided in this embodiment of this disclosure, the terminal device obtains its own mobility information and reports the mobility information to the network device, and the content of the mobility information obtained by the terminal device is more diverse and accurate than mobility information of the terminal device that is obtained by a source base station and then transmitted to a target base station, thereby implementing faster measurement and reporting; the network device receives the mobility information reported by the terminal device, and exchanges the mobility information with the other network devices. Because the content of the mobility information received by the network device is more diverse and accurate, the network device can provide more accurate configuration information for a user based on the mobility information.

The foregoing describes specific embodiments of this specification. Other embodiments fall within the scope of the appended claims. In some cases, the actions or steps recorded in the claims may be performed in a different order than in the embodiments but still achieve a desired result. In addition, the processes depicted in the drawings do not necessarily require the shown specific order or sequential order to achieve the desired result. In some embodiments, multitasking and parallel processing are also possible or may be advantageous.

Figure 4:
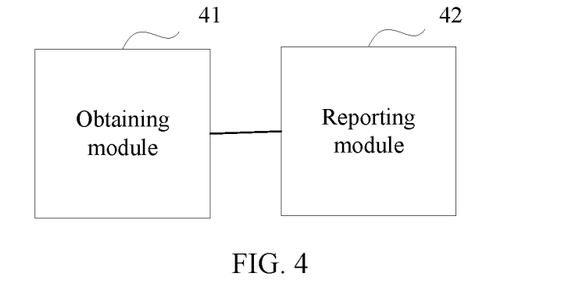
FIG. 4 is a schematic structural diagram of a terminal device according to an embodiment of this disclosure.

FIG. 4 is a schematic structural diagram of a terminal device according to an embodiment of this disclosure. The terminal device includes an obtaining module 41 and a reporting module 42, where the obtaining module 41 obtains mobility information, where the mobility information includes at least one of geographical location information of the terminal device, time information corresponding to the geographical location information, and identification information of the terminal device; and the reporting module 42 reports the mobility information to a network device.

Optionally, the geographical location information includes at least one of coordinate information of the terminal device, identification information of a cell accessed by the terminal device, identification information of a tracking area TA accessed by the terminal device, identification information of a radio access network notification area RNA accessed by the terminal device, identification information of a broadcast area accessed by the terminal device, identification information of a broadcast information sending area accessed by the terminal device, and movement speed information of the terminal device.

Optionally, the time information includes at least one of time point information when the terminal device is at a geographical location and duration in which the terminal device stays at a geographical location.

Optionally, the time point information includes at least one of absolute time information and relative time information.

Optionally, the identification information of the terminal device obtained by the obtaining module includes at least one of identification information determined in subscription to the network device, cell radio network temporary identifier C-RNTI information, system architecture evolution temporary mobile station identity S-TMSI information, international mobile subscriber identity IMSI information, connection resume identification information, flight terminal identification information, and ground terminal identification information.

Optionally, a type of the mobility information includes at least one of the following:

flight movement information; ground movement information; mobility information when the terminal device is in an idle state; mobility information when the terminal device is in a connected state; mobility information when the terminal device is in an inactive state; and mobility information when the terminal device is in a state other than the idle state, the connected state, and the inactive state.

Optionally, the network device includes at least one of a base station, a mobility management entity MME, a serving gateway S-GW, a packet data network gateway PDN-GW, an access and mobility management function AMF entity, a user plane function UPF entity, a session management function SMF entity, and a dedicated application server.

Optionally, the terminal device further includes a receiving module 43, where the reporting module 42 sends, before reporting the mobility information to the network device, prompt information to the network device, where the prompt information is used to prompt that the terminal device has the mobility information; and the receiving module 43 receives a mobility information obtaining request from the network device, where the mobility information obtaining request is used to request the terminal device to report the mobility information.

Optionally, the prompt information includes at least one of the following:

the terminal device has flight movement information; the terminal device has ground movement information; the terminal device has mobility information when the terminal device is in an idle state; the terminal device has mobility information when the terminal device is in a connected state; the terminal device has mobility information when the terminal device is in an inactive state; and the terminal device has mobility information when the terminal device is in a state other than the idle state, the connected state, and the inactive state.

Optionally, the reporting module 42 sending the prompt information to the network device includes:

sending a radio resource control RRC message to the network device, where the RRC message carries the prompt information; or sending a non-access stratum NAS message to the network device, where the NAS message carries the prompt information.

The terminal device provided in this embodiment of this disclosure can implement the processes implemented by the terminal in the method embodiment of FIG. 1. To avoid repetition, details are not described herein again. In this embodiment of this disclosure, the terminal device obtains the mobility information, where the mobility information includes at least one of the geographical location information of the terminal device, the time information corresponding to the geographical location information, and the identification information of the terminal device; and the terminal device reports the mobility information to the network device. In this embodiment of this disclosure, the terminal device obtains its own mobility information, and the mobility information obtained in such a way is more diverse and accurate than mobility information of the terminal device actively obtained by a source base station. Because the mobility information obtained by the terminal device is more diverse and accurate, after the terminal device reports the obtained mobility information to the network device, the network device can provide more accurate configuration information for a user.

Figure 5:
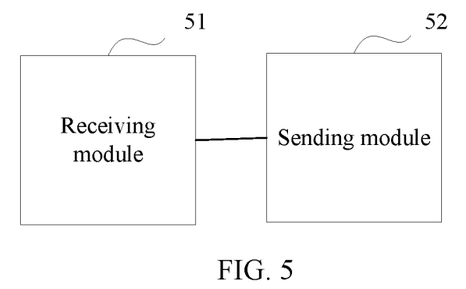
FIG. 5 is a schematic structural diagram of a network device according to an embodiment of this disclosure.

FIG. 5 is a schematic structural diagram of a network device according to an embodiment of this disclosure. The network device includes an receiving module 51 and a sending module 52, where the receiving module 51 receives mobility information reported by a terminal device, where the mobility information is obtained by the terminal device, and the mobility information includes at least one of geographical location information of the terminal device, time information corresponding to the geographical location information, and identification information of the terminal device; and the sending module 52 sends the mobility information to another network device.

Optionally, the geographical location information includes at least one of coordinate information of the terminal device, identification information of a cell accessed by the terminal device, identification information of a tracking area TA accessed by the terminal device, identification information of a radio access network notification area RNA accessed by the terminal device, identification information of a broadcast area accessed by the terminal device, identification information of a broadcast information sending area accessed by the terminal device, and movement speed information of the terminal device.

Optionally, the time information includes at least one of time point information when the terminal device is at a geographical location and duration in which the terminal device stays at a geographical location.

Optionally, the time point information includes at least one of absolute time information and relative time information.

Optionally, the identification information of the terminal device includes at least one of identification information determined in subscription to the network device, cell radio network temporary identifier C-RNTI information, system architecture evolution temporary mobile station identity S-TMSI information, international mobile subscriber identity IMSI information, connection resume identification information, flight terminal identification information, and ground terminal identification information.

Optionally, a type of the mobility information includes at least one of the following:

flight movement information; ground movement information; mobility information when the terminal device is in an idle state; mobility information when the terminal device is in a connected state; mobility information when the terminal device is in an inactive state; and mobility information when the terminal device is in a state other than the idle state, the connected state, and the inactive state.

Optionally, the network device includes at least one of a base station, a mobility management entity MME, a serving gateway S-GW, a packet data network gateway PDN-GW, an access and mobility management function AMF entity, a user plane function UPF entity, a session management function SMF entity, and a dedicated application server.

Optionally, the receiving module 51 receives, before receiving the mobility information reported by the terminal device, prompt information sent by the terminal device, where the prompt information is used to prompt that the terminal device has the mobility information; and the sending module 52 sends a mobility information obtaining request to the terminal device, where the mobility information obtaining request is used to request the terminal device to report the mobility information.

Optionally, the prompt information includes at least one of the following:

the terminal device has flight movement information; the terminal device has ground movement information; the terminal device has mobility information when the terminal device is in an idle state; the terminal device has mobility information when the terminal device is in a connected state; the terminal device has mobility information when the terminal device is in an inactive state; and the terminal device has mobility information when the terminal device is in a state other than the idle state, the connected state, and the inactive state.

Optionally, the sending module 52 sending the mobility information obtaining request to the terminal device includes:

sending a radio resource control RRC message to the terminal device, where the RRC message carries the mobility information obtaining request; or sending a non-access stratum NAS message to the terminal device, where the NAS message carries the mobility information obtaining request.

Optionally, the network device further includes a storage module 53, where the storage module 53 stores the mobility information after the receiving module 51 receives the mobility information reported by the terminal device.

Optionally, the sending module 52 sending the mobility information to the another network device includes:

receiving an information request sent by the another network device, where the information request is used to request to obtain the mobility information; and sending the mobility information to the another network device.

The network device provided in this embodiment of this disclosure can implement the processes implemented by the base station in the method embodiment of FIG. 2. To avoid repetition, details are not described herein again. In this embodiment of this disclosure, the network device receives the mobility information reported by the terminal device, where the mobility information is obtained by the terminal device, and the mobility information includes at least one of the geographical location information of the terminal device, the time information corresponding to the geographical location information, and the identification information of the terminal device; and the network device sends the mobility information to the another network device. In this way, the network device can receive the mobility information reported by the terminal device, and the mobility information obtained in such a way is more diverse and accurate than mobility information of the terminal device obtained from a source base station. Because the mobility information received by the network device is more diverse and accurate, the network device can provide more accurate configuration information for a user.

Figure 6:
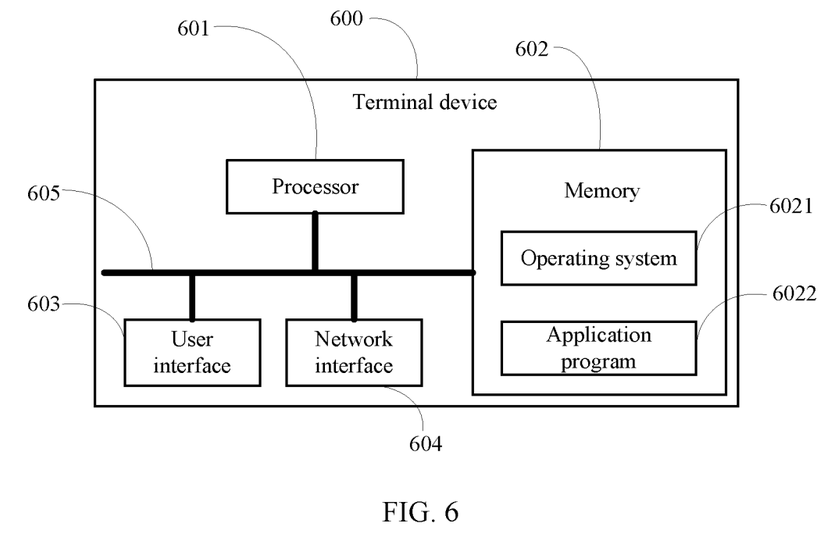
FIG. 6 is a schematic structural diagram of a terminal device according to another embodiment of this disclosure.

In the embodiments of this disclosure, a communications device may include a network device and a terminal device. When the communications device is a terminal device, the communications device is shown in FIG. 6. FIG. 6 is a schematic structural diagram of a terminal device 600 according to another embodiment of this disclosure. The terminal device 600 shown in FIG. 6 includes: at least one processor 601, a memory 602, at least one network interface 604, and a user interface 603. The various components in the terminal device 600 are coupled together through a bus system 605. It can be understood that the bus system 605 is used to implement connection and communication between these components. In addition to a data bus, the bus system

605 further includes a power bus, a control bus, and a status signal bus. However, for clarity of description, various buses are marked as the bus system 605 in FIG. 6.

The user interface 603 may include a display, a keyboard, or a pointing device (for example, a mouse, a trackball (trackball), a touch panel, or a touchscreen).

It can be understood that the memory 602 in this embodiment of this disclosure may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), which is used as an external cache. By way of example but not restrictive description, many forms of RAM may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DRRAM). The memory 602 described in this embodiment of this disclosure is intended to include but not limited to these and any other suitable types of memories.

In some embodiments, the memory 602 stores the following elements: executable modules or data structures, or a subset thereof, or an extended set thereof: an operating system 6021 and an application program 6022.

The operating system 6021 includes various system programs, such as a framework layer, a core library layer, and a driver layer, for implementing various basic services and processing hardware-based tasks. The application program 6022 includes various application programs, such as a media player (Media Player) and a browser (Browser), which are used to implement various application services. A program for implementing the method in the embodiments of this disclosure may be included in the application program 6022.

In this embodiment of this disclosure, the terminal device 600 further includes a computer program that is stored on the memory 602 and capable of running on the processor 601, where when the computer program is executed by the processor 601, the following steps are implemented:

obtaining mobility information, where the mobility information includes at least one of geographical location information of the terminal device, time information corresponding to the geographical location information, and identification information of the terminal device; and reporting the mobility information to a network device.

The method disclosed in the foregoing embodiments of this disclosure may be applied to the processor 601 or implemented by the processor 601. The processor 601 may be an integrated circuit chip, having a signal processing capability. During implementation, the steps of the foregoing method may be completed by hardware integrated logic circuits in the processor 601 or instructions in the form of software. The foregoing processor 601 may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component. The processor 601 can implement or execute the methods, steps, and logical block diagrams disclosed in the embodiments of this disclosure. The general-purpose processor may be a microprocessor, or the processor may be any conventional processor or the like. The steps of the method disclosed with reference to the embodiments of this disclosure may be directly executed and completed by a hardware decoding processor, or executed and completed by a combination of hardware and software modules in a decoding processor. The software module may be located in a computer-readable storage medium mature in the art, such as a random access memory, a flash memory, a read-only memory, a programmable read-only memory or electrically erasable programmable memory, or a register. The computer-readable storage medium is located in the memory 602, and the processor 601 fetches information in the memory 602, and completes the steps of the foregoing method in combination with its hardware. Specifically, the computer-readable storage medium stores a computer program, and when the computer program is executed by the processor 601, the steps of the foregoing mobility information reporting method embodiment are implemented.

It can be understood that the embodiments described in the embodiments of this disclosure may be implemented by hardware, software, firmware, middleware, microcode, or a combination thereof. For hardware implementation, the processor may be implemented in one or more application-specific integrated circuits (Application Specific Integrated Circuit, ASIC), digital signal processors (Digital Signal Processor, DSP), digital signal processing devices (DSP Device, DSPD), programmable logic devices (Programmable Logic Device, PLD), field-programmable gate arrays (Field-Programmable Gate Array, FPGA), general-purpose processors, controllers, microcontrollers, microprocessors, and other electronic units for performing the functions described in this disclosure, or a combination thereof.

For software implementation, the technology described in the embodiments of this disclosure can be implemented by modules (for example, procedures or functions) that perform the functions described in the embodiments of this disclosure. Software code may be stored in the memory and executed by the processor. The memory may be implemented inside the processor or outside the processor.

The terminal device 600 can implement the processes implemented by the terminal device in the foregoing embodiment. To avoid repetition, details are not described herein again.

An embodiment of this disclosure further proposes a computer-readable storage medium, storing one or more programs. The one or more programs include instructions. When the instructions are executed by a communications device including a plurality of application programs, the communications device is caused to perform the method of the embodiment shown in FIG. 1, and specifically to perform the steps of the foregoing recorded mobility information reporting method.

Figure 7:
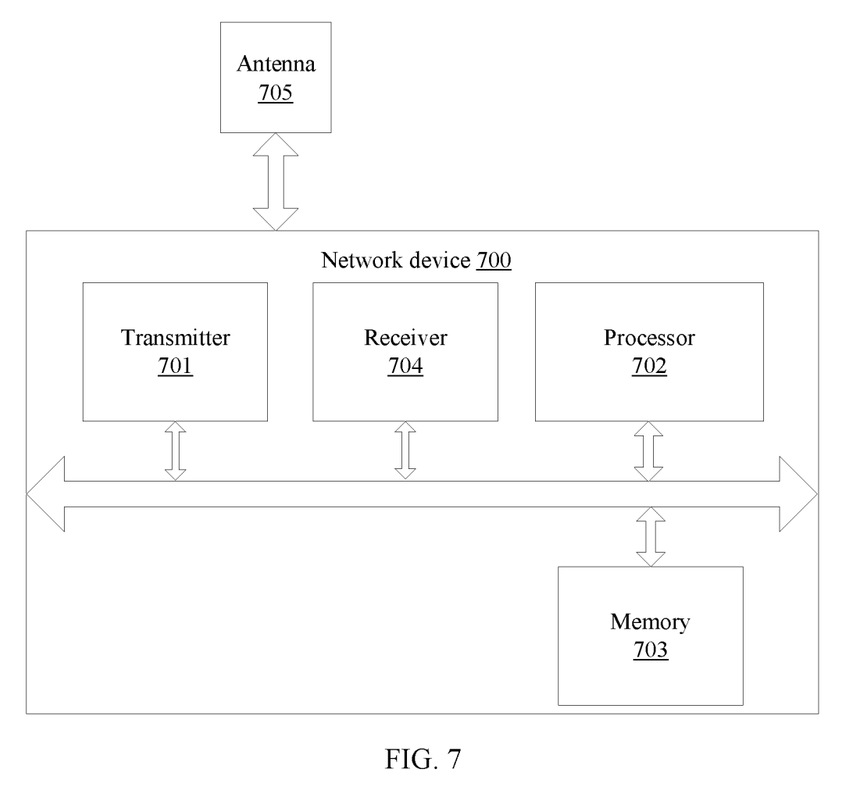
FIG. 7 is a schematic structural diagram of a network device according to another embodiment of this disclosure.

When the communications device is a network device, the communications device is shown in FIG. 7. FIG. 7 is a schematic structural diagram of a network device according to another embodiment of this disclosure. A schematic diagram of a physical apparatus structure of the network device 700 may be that shown in FIG. 7, including a processor 702, a memory 703, a transmitter 701, and a receiver 704. In specific application, the transmitter 701 and the receiver 704 may be coupled to an antenna 705.

The memory 703 is configured to store a program. Specifically, the program may include program code, and the program code includes computer operation instructions. The memory 703 may include a read-only memory and a random access memory, and provides instructions and data to the processor 702. The memory 703 may include a high-speed RAM memory, and may also include a non-volatile memory (non-volatile memory), for example, at least one disk memory.

The processor 702 executes the program stored in the memory 703.

Specifically, in the network device 700, the processor 702 may perform the following method:

receiving mobility information reported by a terminal device, where the mobility information is obtained by the terminal device, and the mobility information includes at least one of geographical location information of the terminal device, time information corresponding to the geographical location information, and identification information of the terminal device; and sending the mobility information to another network device.

The method that is disclosed in the embodiment shown in FIG. 2 of this disclosure and performed by the network device 700 may be applied to the processor 702 or implemented by the processor 702. The processor 702 may be an integrated circuit chip, having a signal processing capability. During implementation, the steps of the foregoing method may be completed by hardware integrated logic circuits in the processor 702 or instructions in the form of software. The processor 702 may be a general-purpose processor, including a central processing unit (Central Processing Unit, CPU) or a network processor (Network Processor, NP); or may be a digital signal processor (DSP), an application-specific integrated circuit (ASIC), a field programmable gate array (FPGA) or another programmable logic device, a discrete gate or transistor logic device, or a discrete hardware component. The processor 601 can implement or execute the methods, steps, and logical block diagrams disclosed in the embodiments of this disclosure. The general-purpose processor may be a microprocessor, or the processor may be any conventional processor or the like. The steps of the method disclosed with reference to the embodiments of this disclosure may be directly executed and completed by a hardware decoding processor, or executed and completed by a combination of hardware and software modules in a decoding processor. The software module may be located in a storage medium mature in the art, such as a random access memory, a flash memory, a read-only memory, a programmable read-only memory or electrically erasable programmable memory, or a register. The storage medium is located in the memory 703, and the processor 702 fetches information in the memory 703, and completes the steps of the foregoing method in combination with its hardware.

The network device may further perform the method shown in FIG. 2 and implement the functions of the network device in the embodiment shown in FIG. 2. Details are not repeated herein in this embodiment of this disclosure.

An embodiment of this disclosure further proposes a computer-readable storage medium, storing one or more programs. The one or more programs include instructions. When the instructions are executed by a communications device including a plurality of application programs, the communications device is caused to perform the method of the embodiment shown in FIG. 2, and specifically to perform the steps of the foregoing recorded mobility information exchange method.

In short, the above descriptions are merely optional embodiments of this disclosure, and are not intended to limit the protection scope of this disclosure. Any modification, equivalent replacement, improvement or the like made within scope of this disclosure shall fall within the protection scope of this disclosure.

The systems, apparatuses, modules, or units explained in the foregoing embodiments may be specifically implemented by a computer chip or entity, or implemented by a product having a particular function. A typical implementation device is a computer. Specifically, the computer may be, for example, a personal computer, a laptop computer, a cell phone, a camera phone, a smartphone, a personal digital assistant, a media player, a navigation device, an email device, a game console, a tablet computer, a wearable device, or any combination of these devices.

Computer-readable media include permanent and non-permanent, removable and non-removable media, and information storage may be implemented by any method or technology. The information may be computer-readable instructions, a data structure, a program module, or other data. Examples of computer storage media include, but are not limited to, a phase-change memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical storage, a magnetic cassette, a magnetic tape, a magnetic disk storage or other magnetic storage devices, or any other non-transmission media, which can be used to store information that can be accessed by a computing device. As defined in this specification, the computer-readable medium does not include transitory computer-readable media (transitory media), such as a modulated data signal and carrier.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

Through the description of the foregoing embodiments, a person skilled in the art can clearly appreciate that the method of the foregoing embodiments may be implemented by software on a necessary general-purpose hardware platform, and certainly may be implemented by hardware. However, in some embodiments, the former is an exemplary implementation. Based on such an understanding, the technical solutions of this disclosure essentially or the part contributing to the related art may be embodied in the form of a software product. The computer software product is stored in a storage medium (such as a ROM/RAM, magnetic disk, or optical disc) and includes several instructions for instructing a terminal (which may be a mobile phone, a computer, a server, an air conditioner, or a network device) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A mobility information reporting method, performed by a terminal device, comprising:
    determining mobility information of the terminal device by the terminal device, wherein the mobility information comprises geographical location information of the terminal device, time information corresponding to the geographical location information, and identification information of the terminal device, wherein the identification information of the terminal device comprises cell radio network temporary identifier (C-RNTI) information and the geographical location information comprises movement speed information of the terminal device comprising a vertical speed of the terminal device;
    recording the mobility information determined by the terminal device in a memory of the terminal device; and
    reporting the mobility information by the terminal device to a network device.

2. The mobility information reporting method of claim 1, wherein
    the geographical location information further comprises at least one of coordinate information of the terminal device, identification information of a cell accessed by the terminal device, identification information of a tracking area (TA) accessed by the terminal device, identification information of a radio access network notification area (RNA) accessed by the terminal device, identification information of a broadcast area accessed by the terminal device, or identification information of a broadcast information sending area accessed by the terminal device.

3. The mobility information reporting method of claim 1, wherein
    the time information comprises at least one of time point information when the terminal device is at a geographical location or a duration in which the terminal device stays at the geographical location.

4. The mobility information reporting method of claim 3, wherein
    the time point information comprises at least one of absolute time information or relative time information.

5. The mobility information reporting method of claim 1, wherein
    the identification information of the terminal device further comprises at least one of identification information determined in subscription to the network device, system architecture evolution temporary mobile subscriber identity (S-TMSI) information, international mobile subscriber identity (IMSI) information, connection resume identification information, flight terminal identification information, or ground terminal identification information.

6. The mobility information reporting method of claim 1, wherein a type of the mobility information comprises at least one of the following:
    flight movement information; ground movement information; mobility information when the terminal device is in an idle state; mobility information when the terminal device is in a connected state; mobility information when the terminal device is in an inactive state; or mobility information when the terminal device is in a state other than the idle state, the connected state, and the inactive state.

7. The mobility information reporting method of claim 1, further comprising:
    sending prompt information to the network device, wherein the prompt information is used to prompt that the terminal device has the mobility information; and
    receiving a mobility information obtaining request from the network device, wherein the mobility information obtaining request is used to request the terminal device to report the mobility information.

8. The mobility information reporting method of claim 7, wherein the prompt information indicates at least one of the following:
    the terminal device has flight movement information; the terminal device has ground movement information; the terminal device has mobility information when the terminal device is in an idle state; the terminal device has mobility information when the terminal device is in a connected state; the terminal device has mobility information when the terminal device is in an inactive state; or the terminal device has mobility information when the terminal device is in a state other than the idle state, the connected state, and the inactive state.

9. The mobility information reporting method of claim 7, wherein sending prompt information to the network device comprises:
    sending a radio resource control (RRC) message to the network device, wherein the RRC message carries the prompt information; or
    sending a non-access stratum (NAS) message to the network device, wherein the NAS message carries the prompt information.

10. A terminal device, comprising:
    a processor configured to:
    determine mobility information of the terminal device, wherein the mobility information comprises geographical location information of the terminal device, time information corresponding to the geographical location information, and identification information of the terminal device, wherein the identification information of the terminal device comprises cell radio network temporary identifier (C-RNTI) information and the geographical location information comprises movement speed information of the terminal device comprising a vertical speed of the terminal device;
    recording the mobility information determined by the terminal device in a memory of the terminal device; and
    report the mobility information to a network device.

11. The terminal device of claim 10, wherein
    the geographical location information further comprises at least one of coordinate information of the terminal device, identification information of a cell accessed by the terminal device, identification information of a TA accessed by the terminal device, identification information of a RNA accessed by the terminal device, identification information of a broadcast area accessed by the terminal device, or identification information of a broadcast information sending area accessed by the terminal device.

12. The terminal device of claim 10, wherein
the time information comprises at least one of time point information when the terminal device is at a geographical location or a duration in which the terminal device stays at the geographical location.

13. The terminal device of claim 12, wherein
the time point information comprises at least one of absolute time information or relative time information.

14. The terminal device of claim 10, wherein
the identification information of the terminal device further comprises at least one of identification information determined in subscription to the network device, S-TMSI information, IMSI information, connection resume identification information, flight terminal identification information, or ground terminal identification information.

15. The terminal device of claim 10, wherein a type of the mobility information comprises at least one of the following:
flight movement information; ground movement information; mobility information when the terminal device is in an idle state; mobility information when the terminal device is in a connected state; mobility information when the terminal device is in an inactive state; or mobility information when the terminal device is in a state other than the idle state, the connected state, and the inactive state.

16. The terminal device of claim 10, wherein
the network device comprises at least one of a base station, an MME, an S-GW, a PDN-GW, an AMF entity, a UPF entity, an SMF entity, or a dedicated application server.

17. The terminal device of claim 10, wherein the processor is further configured to:
send, before reporting the mobility information to the network device, prompt information to the network device, wherein the prompt information is used to prompt that the terminal device has the mobility information; and
receive a mobility information obtaining request from the network device, wherein the mobility information obtaining request is used to request the terminal device to report the mobility information.

18. The terminal device of claim 17, wherein the prompt information comprises at least one of the following:
the terminal device has flight movement information; the terminal device has ground movement information; the terminal device has mobility information when the terminal device is in an idle state; the terminal device has mobility information when the terminal device is in a connected state; the terminal device has mobility information when the terminal device is in an inactive state; or the terminal device has mobility information when the terminal device is in a state other than the idle state, the connected state, and the inactive state, wherein to send the prompt information to the network device, the processor is further configured to:
send a RRC message to the network device, wherein the RRC message carries the prompt information; or
send a NAS message to the network device, wherein the NAS message carries the prompt information.

19. A non-transitory computer-readable storage medium, storing a computer program, wherein when the computer program is executed by a processor of a terminal device, the method comprising:
determining mobility information of the terminal device by the terminal device, wherein the mobility information comprises geographical location information of the terminal device, time information corresponding to the geographical location information, and identification information of the terminal device, wherein the identification information of the terminal device comprises cell radio network temporary identifier (C-RNTI) information and the geographical location information comprises movement speed information of the terminal device comprising a vertical speed of the terminal device;
recording the mobility information determined by the terminal device in a memory of the terminal device; and
reporting the mobility information by the terminal device to a network device.

20. The non-transitory computer-readable storage medium of claim 19, wherein
the time information comprises at least one of time point information when the terminal device is at a geographical location or a duration in which the terminal device stays at the geographical location.

* * * * *